Figure 1:
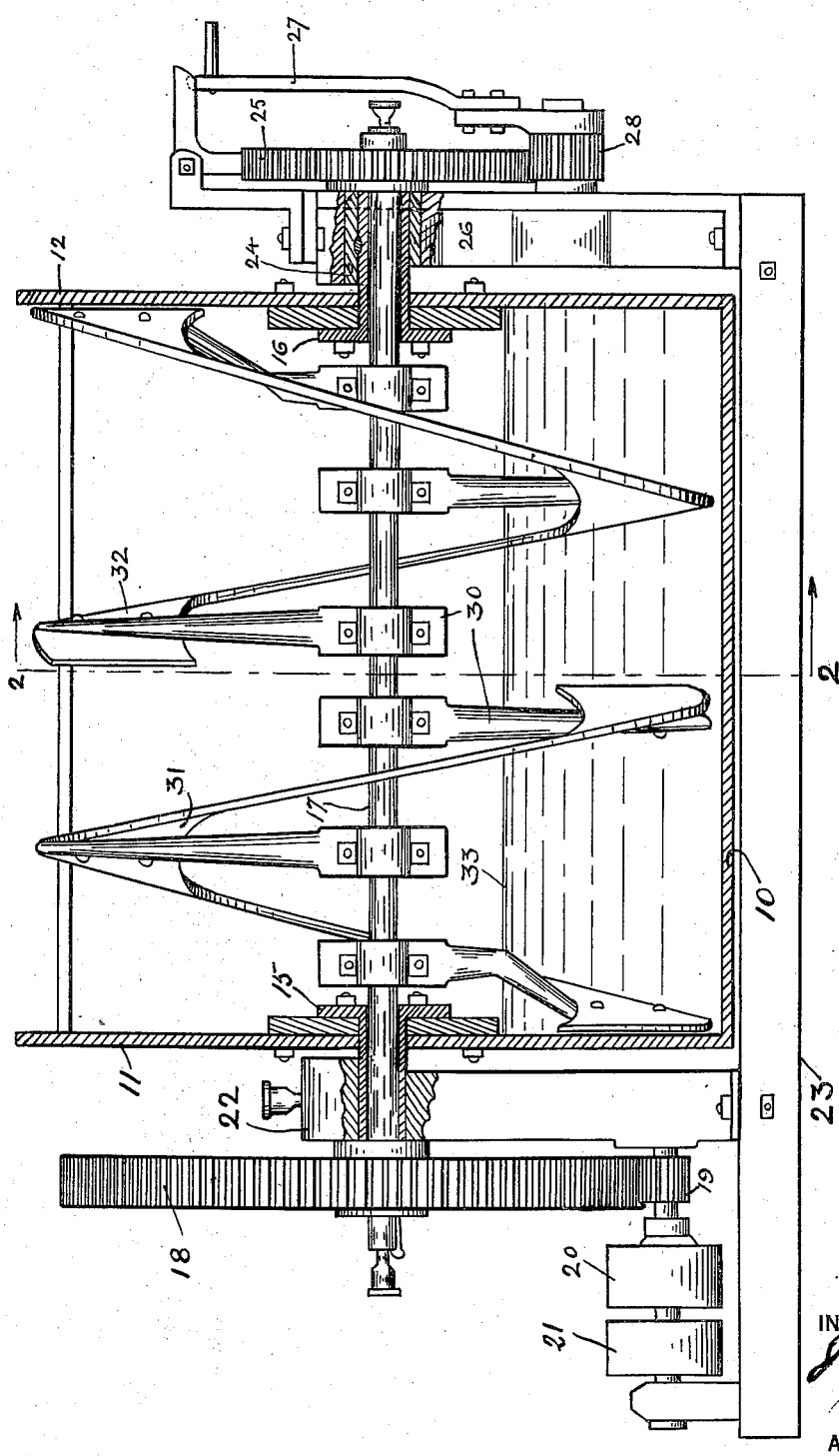

Jan. 1, 1935.   J. A. RICE   1,985,905
METHOD OF MAKING CELLULAR CONCRETE
Filed Oct. 26, 1926   2 Sheets-Sheet 2
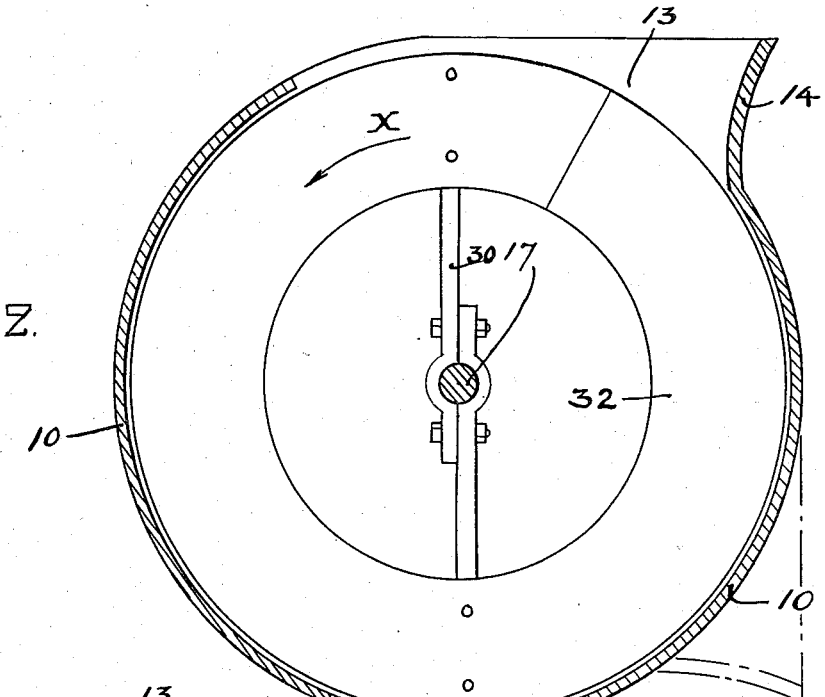
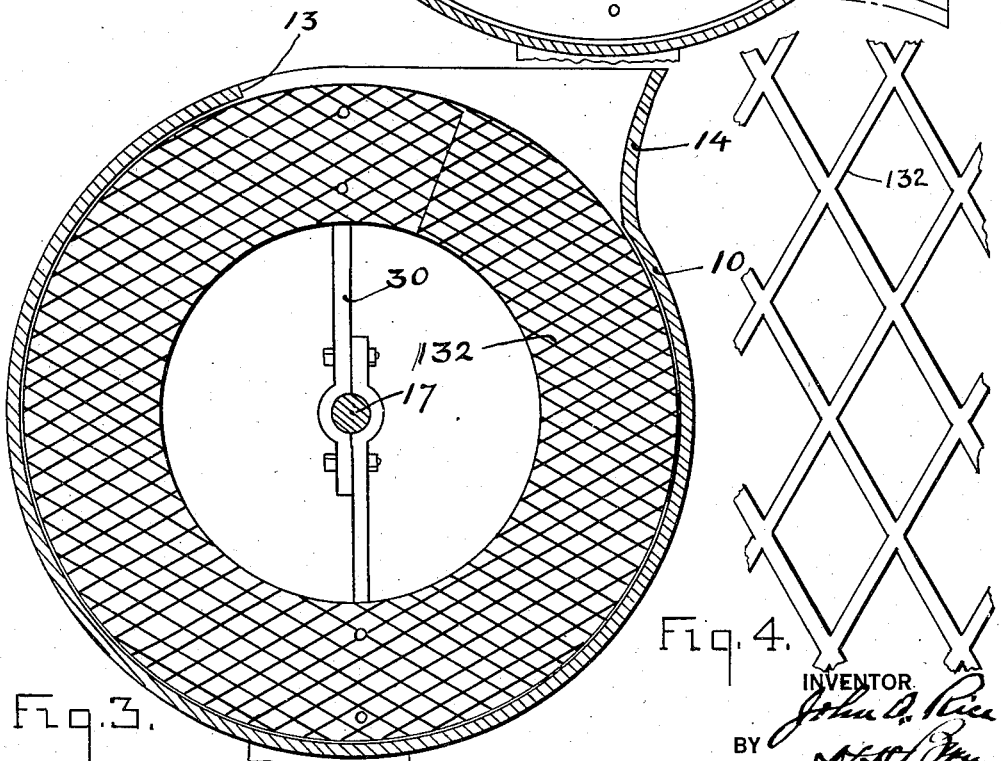

Patented Jan. 1, 1935

1,985,905

UNITED STATES PATENT OFFICE 1,985,905

METHOD OF MAKING CELLULAR CONCRETE

John A. Rice, Berkeley, Calif., assignor to The Bubblestone Company, Pittsburgh, Pa., a corporation of Pennsylvania Application October 26, 1926, Serial No. 144,392

3 Claims. (Cl. 106—24)

My invention relates to a method of making cellular concrete by mixing cement and sand or other fine aggregate and charging or filling the same with minute air cells, thus increasing the bulk thereof without materially adding to its weight.

For this purpose I mix suitable proportions of cement, sand and water, thus forming a thin slurry or liquid mortar to which I add a proper amount of foam compound. This mixture is then placed in a suitable mixing machine, the function of which is to force, by agitation, the minute air bubbles into the mortar, thereby increasing the bulk until the mixture has the desired weight for unit of volume of the required specific gravity.

The completed mixture is thereupon transferred to suitable molds and allowed to set and harden.

It is practically immaterial what kind of alkaline cement is used, and various kinds, such as Portland cement, aluminous cements, such as limnite and gypsum cements, are equally suitable.

The compound which is introduced into the mix for the purpose of obtaining a foaming consistency may be made as follows:

| | Parts by weight |
|---|---|
| Casein, finely graduated | 100 |
| Water | 500 |
| Calcium hydrate | 25 |
| Benzoic acid | 7 |
| Beta naphthol | 1 |
| Arsenious acid ($As_2O_3$) | 1 |

The casein (finely graduated), the water, and the arsenious acid are first mixed until the casein is soaked and in homogeneous suspension; second the calcium hydrate is then added under gentle stirring until the casein is completely dissolved, whereupon this mixture is set aside for from fifteen (15) to twenty (20) days, or until peptization is complete. Third, ingredients benzoic acid and beta naphthol are now added to the mixture either dry or suspended in a small amount of water. As soon as the benzoic acid and beta naphthol have been dissolved the compound is ready for use as already described.

In the accompanying drawings has been illustrated a suitable mixing machine for forcing the air or gas into the slurry.

Figure 1 is a side elevation partly in section of the mixing machine;

Figure 2, a section along line 2—2 of Figure 1;

Figure 3, a similar section, showing the preferred blade construction; and

Figure 4, a fragmentary detail of a blade in larger scale.

In the drawings reference numeral 10 represents a vessel or container of substantially cylindrical shape with its axis preferably horizontal, as shown. Both its ends are closed by walls 11 and 12 and its top side open, as at 13, when the mixing machine is in its normal or operating position, as shown in full lines on the drawings, the opening terminating with a lip 14 to facilitate discharge of the container when in tilted position as indicated by dot and dash lines. By means of flanged bushings or sleeves 15, 16, the container is mounted on a shaft 17 freely revoluble therein.

At the left end of the shaft a gear wheel 18 in mesh with a pinion 19 is keyed or in any other manner secured thereto and a pulley 20 having an idler 21 is driven by a belt from a motor not shown and in turn revolves the shaft 17 and the gear wheel 18 through the pinion 19.

The sleeve or bushing 15 is mounted to revolve in a bearing 22 secured on the base 23. The sleeve 16 at the other end of the shaft is rigidly secured in the hub 24 of the spur gear 25 and mounted to revolve in the bearing 26 also secured to the base 23. In this manner the container can be tilted independent of the shaft 17 through the intermediary of the spur gear 25 when actuated from the crank handle 27 through the pinion 28.

Upon the shaft 17 are rigidly secured by means of radial arms 30 the helical blades 31, 32, of which blade 31 has right-hand pitch and 32 left-hand pitch. Accordingly counter currents are set up in the contents of the vessel, both running from the end walls 11, 12 towards the middle of the container or vessel 10, when the shaft 17 with the blades 31, 32 is revolved. The helical blades may be made from coarse screen wire or expanded metal 132, as shown in Figures 3 and 4, or from sheet metal, as in Figure 2, or any other metallic fabric. In some cases I may provide only one helical blade coiled in one direction only and extending from end to end of the cylindrical vessel, which in that case must have considerable length, the filling then taking place at one end while the discharge is made at the opposite end of the vessel.

In carrying out the present invention a suitable mixture of cement, sand and water is first placed in the container, filling the vessel to about one-third full, as indicated by surface 33. This mixture or "slurry" should contain a sufficient amount of water to make it thin enough to run from a spoon. To this slurry in the container is then added the already described foam compound to the amount of one percentum of the cement used. This is the preferred proportion, but it may be varied between wide margins. The foam compound may be added to the slurry after the latter has been prepared, but is preferably poured into the water from which the slurry is prepared.

When the container has been charged with slurry and foam compound as now described, the shaft 17 with the helical blades is set in motion by starting the motor. The peripheral speed of the blades should be approximately fifty feet per minute, but a wide variation is permissible. The helical blades 31, 32 or 132 will then drag bubbles from the foamy compound below the surface 33 into the slurry. Gradually the volume of cement mix will then increase, due to the accumulation of entrapped air. As soon as the mixture has become of the desired specific gravity the operation is stopped and the mixture is then discharged from the container by turning the crank handle 27 to tilt it. The mixture is then poured into suitable molds and allowed to set and harden. The resulting product will be concrete blocks of light weight and cellular structure.

In contradistinction of the method described in copending application Serial No. 144,391 no compressed gas or air is used, but air taken direct from the atmosphere or gas of atmospheric pressure is utilized to make the foam.

It should be pointed out that the finished blocks are not porous like a sponge; that is to say, they have no spaces or cavities open at the surfaces of the blocks through which water or moisture could be absorbed. On the contrary, the cavities in the blocks are cellular; that means closed on all sides and not open to the atmosphere.

In the claims the term "slurry" indicates the usual mixture of cement, sand and water, or their equivalents ordinarily used in fluid or semi-fluid form in preparation of concrete. "Foam" or "foam compound" denotes the compound composed and prepared as above; and "cellular concrete" denotes the resultant product with cellular as distinguished from porous consistency.

This machine works to drag air into the slurry and, therefore, the motion should be vigorous, such that the speed may be greater than when it is desired to gently mix ready made foam with cement slurry.

It is to be understood that the invention as here described may be varied considerably as to the ingredients used and the steps of the method within the scope of the claims.

I claim:

1. A method of making cellular concrete, consisting in first preparing a slurry, then separately preparing a foam compound, then driving the foam compound into the slurry by agitation in opposite directions, and lastly permitting the mixture to harden in suitable molds, said foam compound containing casein, water, calcium hydrate, benzoic acid, beta naphthol, and arsenious acid, or their equivalents in suitable proportions, substantially as set forth.

2. A method of making cellular concrete, consisting in first preparing a slurrry, then separately preparing a foam compound, then driving the foam compound into the slurry by agitation in opposite directions, and lastly permitting the mixture to harden in suitable molds, said foam compound containing casein, water, calcium hydrate, benzoic acid, beta naphthol, and arsenious acid, or their equivalents in the following proportions, respectively: 100, 500, 25, 7, 1 and 1 parts by weight, substantially as set forth.

3. A method of making cellular concrete, consisting in first preparing a slurry, then separately preparing a foam compound, then driving the foam compound into the slurry by agitation in opposite directions, and lastly permitting the mixture to harden in suitable molds, said foam compound containing casein, water, calcium hydrate, benzoic acid, beta naphthol, and arsenious acid, or their equivalents in the following proportions, respectively: 100, 500, 25, 7, 1 and 1 parts by weight; of these ingredients the casein is first soaked in the water, together with the arsenious acid, until in homogeneous suspension; under agitation the calcium hydrate is added until the casein is completely dissolved; this mixture is then permitted to stand for from fifteen (15) to twenty (20) days, whereupon the benzoic acid and the beta naphthol are dissolved in the said mixture, substantially as set forth.

JOHN A. RICE.